INVENTORS
FRED L. KATZMANN
ROBERT J. SCHNELL
BY Darby & Darby
ATTORNEYS

INVENTORS
FRED L. KATZMANN
ROBERT J. SCHNELL
BY Darby & Darby
ATTORNEYS 2,928,985

CATHODE RAY OSCILLOGRAPH

Fred L. Katzmann, Cedar Grove, and Robert J. Schnell, Hasbrouck Heights, N.J., assignors to Allen B. Du Mont Laboratories, Inc., Clifton, N.J., a corporation of Delaware Application May 6, 1958, Serial No. 733,419

4 Claims. (Cl. 315—30)

The present invention relates to cathode ray oscillographs and more particularly to an improved means for blanking and unblanking the electron beam more rapidly than has been heretofore possible.

As is well known, a cathode ray oscillograph comprises a cathode ray tube and circuitry to sweep the electron beam across the face of a fluorescent screen to thereby produce a line across the screen. This line is produced by use of a sweep circuit which applies a sweep voltage to the horizontal deflection plates of the cathode ray tube. A signal voltage applied to the vertical deflection plates of the tube then produces a deviation of the beam position in the vertical direction thereby causing the trace on the tube to be a trace of the waveform under observation.

Such cathode ray oscillographs are used for the purpose of studying steady state cyclic phenomena, transient phenomena and varying repetitive transient phenomena.

The cathode ray tube utilized is, as has been indicated, of the usual type having a cathode, control grid, and accelerating and focusing anodes together with the vertical and horizontal deflection system which has been mentioned.

It is desirable, especially when observing transient or repetitive transient phenomena, that the electron beam be rapidly brought to a sufficient strength or, in other words, that the beam current be brought to a sufficient level so that the trace thereof on the fluorescent screen will start at the beginning of the horizontal sweep to thus assure that no part of the signal to be observed will be lost due to the electron beam not having reached a sufficient strength to energize the phosphor. At the present time this desirable result is not achieved, nor even closely approached.

The present invention provides a means for assuring that rapidly recurring phenomena or transient phenomena will produce a trace which includes the entire signal and does not lose the first portion thereof.

In the present invention this is achieved by applying a negative going assist pulse to the cathode ray tube cathode at the instant that the normal positive going unblanking signal is applied to the control grid. (It should perhaps be mentioned at this point that the unblanking signal is necessary since the beam current must be reduced below the level at which it energizes the fluorescent material while the sweep voltage applied to the horizontal deflection means returns to an initial value at which the electron beam will be at the left hand side of the tube raster.) While the negative assist pulse mentioned does not necessarily have to have a rise time that is faster than the rise time of the positive gating pulse to the control grid, it should occur in the interval between the start of the sweep and the point of maximum blanking voltage.

Similarly, this invention provides means for substantially instantaneously cutting off the electron flow assuring that the tube is dark during retrace which means comprises applying a positive going assist pulse to the cathode at the instant that the normal negative going portion of the blanking signal is applied to the control grid. As was the case with the unblanking pulse, this positive going assist pulse does not necessarily have to have a fall time that is faster than the fall time of the negative going blanking gate, the only requirement being that the positive going assist pulse be applied immediately upon retrace.

It is an object of the invention to provide a cathode ray oscillograph wherein the time required to restore the cathode ray tube to unblanked from blanked condition is extremely short.

It is another object of this invention to provide a cathode ray oscillograph wherein the time required to cut off the cathode ray beam after it has been operating is extremely short, or in other words, the time required to go from unblanked to blanked condition is extremely short.

The features of my invention which I believe to be novel are set forth with particularity in the appended claims. My invention itself, however, both as to its organization and method of operation, together with further objects and advantages thereof may best be understood by referring to the following description taken in conjunction with the accompanying drawings in which, Fig. 1 represents the waveform of the sweep voltages applied to the horizontal deflecting plate;

Figure 1:
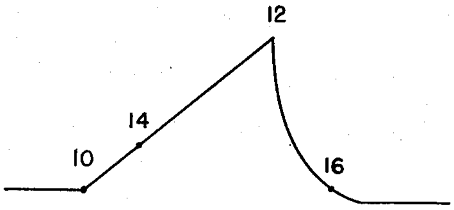

Before describing our invention we will briefly indicate the reasons for the defects in the present oscillograph mentioned above. Referring to the drawings, Fig. 1 shows that the waveshape of the sweep voltage or time base is essentially a sawtooth. This waveshape is applied to the horizontal deflection plates to deflect the beam across the screen. It is desirable that the beam be formed at the instant the voltage rises from point 10. It is also desirable that the beam be cut off when the sweep voltage reaches point 12.

Figure 2:
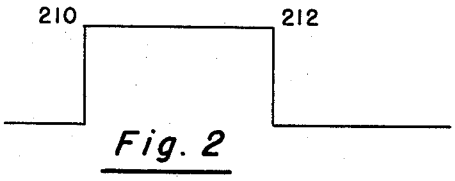
Fig. 2 represents the ideal waveshape of the signal applied to the control grid of the cathode ray tube to unblank the beam where the voltage on the cathode is held constant.

Fig. 2 represents the ideal unblanking-blanking pulse applied to the control electrode of the cathode ray tube to turn the beam on wherein the voltage applied to the control grid instantaneously rises from some low value representing beam cutoff, to a higher value (210) representing beam unblanking. Also, ideal conditions dictate that the beam be instantaneously cut off or blanked as represented by the fall of the unblanking voltage from point 212 to some low value representing visual cutoff. In practice, however, the waveshape of the unblanking signal appears as in Fig. 3 where, at point 310, the voltage starts a gradual build up as a positive pulse applied to the grid of the cathode ray tube.

Figure 3:
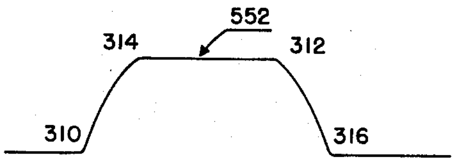
Fig. 3 represents the actual beam unblanking waveshape applied to the grid of the cathode ray tube.

Since the unblanking signal or gate of Fig. 3 has a finite rise time, this waveshape produces a gradual turn-on of the beam current. Under these circumstances, where the beam is not turned on fully until point 314 of Fig. 3 is reached, it will be seen that the sweep voltage applied to the horizontal deflection plates will have progressed from point 10 to point 14 of Fig. 1 at which time the trace becomes fully visible. Since the beam current will be sufficient to result in a visible trace only an appreciable time after the horizontal sweep has begun, any signal occurring in time before point 414 of Fig. 4 will be lost.

Figure 4:
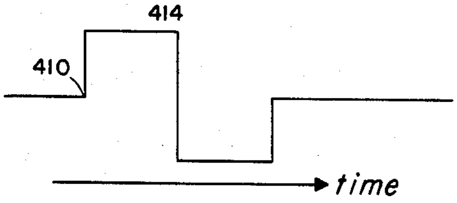
Fig. 4 represents a hypothetical signal for illustrative purposes applied to the vertical deflection plates.

If now the signal of Fig. 4 is applied to the vertical deflection plates and the beam is unblanked by the signal of Fig. 3, none of the signal appearing before point 414 of Fig. 4 will appear. As previously stated, it is imperative that the unblanking signal closely approached the configuration of Fig. 2 so that the beam is turned on instantaneously and the rising portion 410 of Fig. 4 be properly displayed.

By the same token it is required that the beam be cut off at point 12 of Fig. 1 as indicated by point 212 of Fig. 2. However, since under actual operating conditions the fall time of the voltage applied to the control electrode is in the nature of the waveshape between points 312—316 of Fig. 3, very frequently the beam stays turned on during the first portion of the retrace between points 12 and 16 of Fig. 1.

Figure 5:
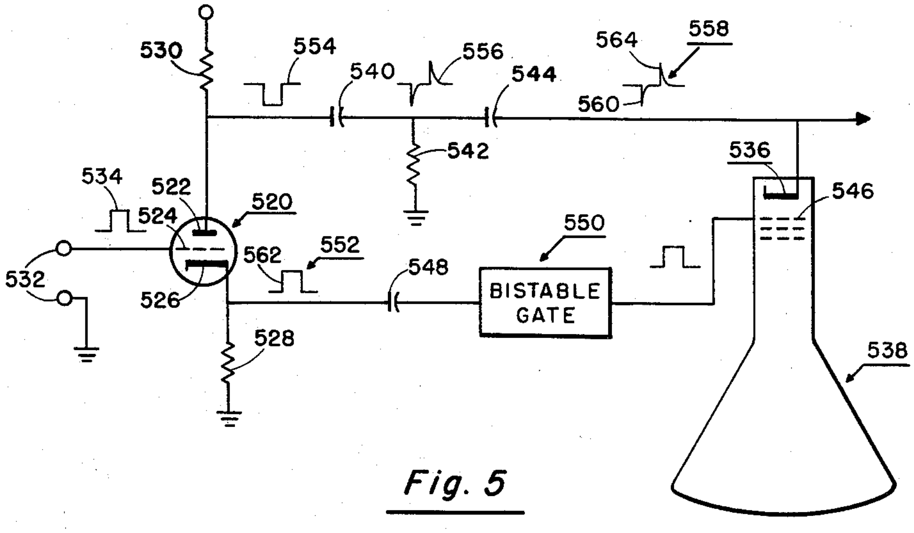
Fig. 5 represents one embodiment of our invention using a differentiating network to produce the desired result.

The above defects are overcome by the use of our invention. In Fig. 5, which illustrates one embodiment thereof, tube 520 has an anode 522, a control grid 524 and a cathode 526. Cathode resistor 528 is connected between cathode 526 and ground, and load resistor 530 is connected between anode 522 and a source of positive potential. Input 532 is connected to grid 524 and supplies the grid with an input voltage having the waveshape indicated by 534. Plate 522 is connected to cathode 536 of cathode ray tube 538 through a differentiating circuit consisting of condenser 540 and resistor 542 and through peaking condenser 544. Cathode 526 is connected to grid 546 of cathode ray tube 538 through coupling condenser 548 and the bistable gate 550. Condenser 548 and gate circuit 550 together represent the A.C. coupling means between cathode follower 526 and grid 546.

If now, signal 534 is applied to grid 524 of cathode follower 520, a signal is produced across cathode resistor 528 having the waveshape and polarity depicted by waveshape 552. This waveshape 552 is applied through condenser 548 to gate 550 for application to grid 546 of the cathode ray tube. This is the signal that is used to unblank the beam and corresponds identically with waveshape 552 of Fig. 3. Simultaneously with the production of signal 552 waveshape 554 is produced at anode 522. This signal is differentiated across the capacitor-resistor combination consisting of 540—542 and appears as signal 556. Signal 556 is then coupled to cathode 536 through condenser 544 which condenser serves to further peak the signal so that the signal applied to cathode 536 appears in the waveshape of 558. Since negative going spike 560 of waveshape 558 is accurately timed to appear on the cathode at the instant the positive going leading edge 562 of waveshape 552 appears on grid 546, the beam is unblanked much sooner than it would have been had only a positive going signal been applied to grid 546.

Figure 7:
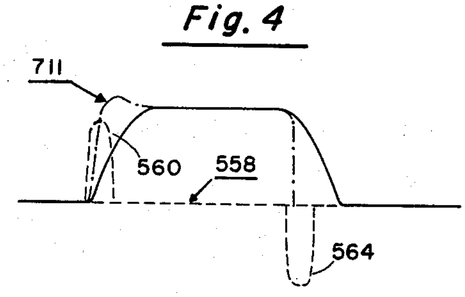
Fig. 7 represents the combined waveshape of the signals applied simultaneously to the grid and cathode to produce the desired result.

Referring now to Fig. 7 it should be noted that waveshape 558 is presented in the opposite polarity than shown in Fig. 5. Since a negative going signal applied to a cathode is the full equivalent of applying a positive going signal to a grid it is reasonable to present the signal applied to the cathode in such a manner as to indicate that it is assisting the signal applied to the grid. Thus, assist pulse 560 of waveshape 558 is shown as a very sharply peaked signal. When applied to cathode 536 in combination with the positive going portion of signal 552 that is applied to grid 546, cathode 536 is thus made more negative with respect to grid 546 while grid 546 is being slowly driven positive. The resultant effect of combining grid signal 552 with the peaked portion 560 of cathode signal 558 results in a combined waveform 711 which very closely approximates the ideal condition waveshape of Fig. 2. The resultant effect insofar as the turning on of the beam current is concerned is a rapid turn on that is accurately timed to appear at the very outset of the sweep voltage.

To provide for a rapid blanking of the beam that is accurately timed with the retrace interval, positive going spike 564 is applied to cathode 536 simultaneously with the negative going trailing edge of waveshape 552. Thus, cathode 536 is driven highly positive while grid 546 is driven more slowly negative resulting in a rapid, accurately timed cutoff of beam current.

Figure 6:
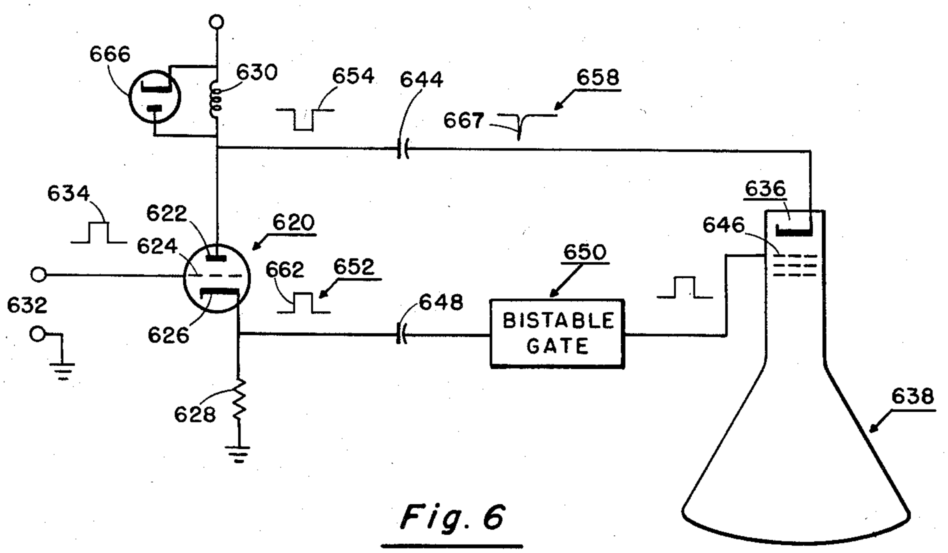
Fig. 6 represents another embodiment of our invention using a parallel inductance diode combination to produce the desired result.

In the embodiment of Fig. 6 cathode follower 620 has inductance 630 and diode 666 connected between a source of positive potential and anode 622. Resistor 628 is connected between cathode 626 and ground. Condenser 644 is connected between anode 622 and cathode 636 of cathode ray tube 638. Cathode 626 is coupled to grid 646 of cathode ray tube 638 through the A.C. coupling network consisting of series condenser 648 and the series bistable gate 650. In this embodiment, the positive going signal 634 (obtained from input 632) is applied to grid 624. Positive going signal 652 is A.C. coupled through condenser 648 and gate circuit 650 to control grid 646 of cathode ray tube 638. However, instead of the differentiating network of Fig. 5, Fig. 6 has inductance 630 and diode 666 connected to plate 622. By using this particular combination, of inductance and diode, the signal appearing as 654 now manifests itself at anode 622. This signal 654 is coupled through condenser 644 and appears as a peaked signal 658 to be applied to cathode 636 of cathode ray tube 638. By using this combination of inductance and diode, only a peaked negative going signal 658 appears at the cathode and, as in the previous embodiment, the leading edge 667 of waveshape 658 appears accurately timed with leading edge 662 of waveshape 652 thereby providing the necessary assist pulse to quickly and accurately unblank the beam so that it may appear at the very outset of the horizontal trace.

While there has been described what is presently considered the preferred embodiments of our invention, it will be obvious to those skilled in the art that various changes and modifications may be made therein without departing from the inventive concept, and it is aimed in the appended claims to cover all such changes and modifications as fall within the true spirit and scope of this invention.

What is claimed is:

1. A device for rapidly unblanking a cathode ray oscillograph beam comprising a cathode ray tube having at least a cathode and a control grid, means applying a slowly rising positive going unblanking signal to said control grid and means simultaneously driving said cathode negative with respect to said control grid, said last named means comprising a differentiating circuit and a sharpening capacitor to apply a sharp negative spike of voltage to said cathode with respect to said control grid whereby said beam is rapidly unblanked.

2. The device of claim 1 further comprising an electron discharge device having an input electrode and a pair of output electrodes, said positive going unblanking signal being applied to said input electrode, one of said output electrodes applying a positive going signal to said cathode ray tube control grid, the other of said output electrodes applying a negative going signal to said differentiating circuit.

3. The device of claim 2 wherein said electron discharge device comprises a cathode follower connected vacuum tube wherein said input electrode is a control grid, said output electrode applying said positive going signal is a cathode, and said other output electrode applying negative going signal is an anode.

4. The device of claim 3 wherein said means driving said cathode ray tube cathode negative with respect to said cathode ray tube control grid comprises a differentiating circuit having a pair of series capacitors, a shunt resistance connected between the common point of said capacitors, said differentiating circuit connected between said cathode follower anode and said cathode ray tube cathode.

References Cited in the file of this patent

UNITED STATES PATENTS

| | | |
|---|---|---|
| 2,421,520 | Poch | June 3, 1947 |
| 2,595,228 | Crist | May 6, 1952 |
| 2,677,786 | Schlesinger | May 4, 1954 |
| 2,686,225 | Baker | Aug. 10, 1954 |
| 2,740,071 | Goldmark et al. | Mar. 27, 1956 |
| 2,743,313 | Schwarz | Aug. 24, 1956 |
| 2,804,571 | Kobbe | Aug. 27, 1957 |